(12) United States Patent  
Pabst et al.

(10) Patent No.: US 10,833,494 B2  
(45) Date of Patent: Nov. 10, 2020

(54) APPARATUS, METHOD AND SYSTEM FOR ELECTRICAL INTERCONNECTION

(71) Applicant: NOKIA SHANGHAI BELL CO., LTD., Shanghai (CN)

(72) Inventors: Markus Pabst, Hannover (DE); Bernhard Wendorff, Garbsen (DE); Jan Gwinner, Hannover (DE); Ahmed Malti, Gelsenkirchen (DE)

(73) Assignee: NOKIA SHANGHAI BELL CO., LTD., Shanghai (CN)

( * ) Notice: Subject to any disclaimer, the term of this patent is extended or adjusted under 35 U.S.C. 154(b) by 0 days.

(21) Appl. No.: 16/582,562

(22) Filed: Sep. 25, 2019

(65) Prior Publication Data

US 2020/0099203 A1 Mar. 26, 2020

(30) Foreign Application Priority Data

Sep. 25, 2018 (EP) ..................... 18196697

(51) Int. Cl.
*H01B 7/18* (2006.01)
*H02G 3/04* (2006.01)
*H01B 7/00* (2006.01)

(52) U.S. Cl.
CPC ......... *H02G 3/0406* (2013.01); *H01B 7/0045* (2013.01); *H01B 7/185* (2013.01); *H02G 3/0481* (2013.01)

(58) Field of Classification Search
CPC .... H02G 3/0406; H02G 3/0481; H01B 7/185; H01B 7/0045
USPC ....................................................... 174/70 R
See application file for complete search history.

(56) References Cited

U.S. PATENT DOCUMENTS

| 2,804,494 | A | * | 8/1957 | Fenton | ..... | H01P 3/04 |
|-----------|---|---|--------|--------|------|-----------|
| | | | | | | 174/113 AS |
| 3,474,189 | A | * | 10/1969 | Arnaudin, Jr. | ......... | H01B 9/028 |
| | | | | | | 174/115 |
| 3,728,474 | A | * | 4/1973 | Arnaudin, Jr. | ......... | H01B 9/026 |
| | | | | | | 174/115 |
| 3,800,061 | A | * | 3/1974 | Larson | .................. | H01B 12/10 |
| | | | | | | 174/15.5 |

(Continued)

FOREIGN PATENT DOCUMENTS

| CN | 103069506 A | 4/2013 |
|----|-------------|--------|
| CN | 104698561 A | 6/2015 |
| CN | 107274998 A | 10/2017 |

OTHER PUBLICATIONS

Chinese Office Action corresponding to CN Application No. 201910914034.4, dated Sep. 18, 2020.

*Primary Examiner* — Sherman Ng
(74) *Attorney, Agent, or Firm* — Squire Patton Boggs (US) LLP

(57) ABSTRACT

Certain examples relate to an apparatus, method and system for electrical interconnection. Certain examples provide an apparatus comprising: an outer longitudinally extending member comprising a longitudinally extending perimeter region defining an inner longitudinally extending cavity; and at least a first longitudinally extending conductor and a separate second longitudinally extending conductor; wherein the at least first and second longitudinally extending conductors are embedded within the longitudinally extending perimeter region and extend along the length thereof.

20 Claims, 6 Drawing Sheets

(56) References Cited

U.S. PATENT DOCUMENTS

| | | | |
|---|---|---|---|
| 8,280,209 B2* | 10/2012 | Bollinger, Jr. | G02B 6/4459 |
| | | | 385/106 |
| 2002/0162674 A1* | 11/2002 | Bertini | H01B 7/2813 |
| | | | 174/47 |
| 2009/0046983 A1 | 2/2009 | Varkey et al. | |
| 2010/0202741 A1 | 8/2010 | Ryan et al. | |
| 2015/0276096 A1* | 10/2015 | Chen | H02G 1/086 |
| | | | 174/68.3 |
| 2017/0012668 A1* | 1/2017 | Fang | H04B 3/54 |
| 2017/0365379 A1 | 12/2017 | Broughton et al. | |

* cited by examiner

ND SYSTEM FOR
APPARATUS, METHOD AND SYSTEM FOR ELECTRICAL INTERCONNECTION

TECHNOLOGICAL FIELD

Examples of the present disclosure relate to an apparatus, method and system for electrical interconnection. Certain examples relate to an electrical power cable. In particular, though without prejudice to the foregoing, certain examples relate to a modular composite power and optical cable for interconnecting a Remote Radio Unit (RRU) with: a Power Supply Unit (PSU) and a Base Band Unit (BBU).

BACKGROUND

Power cables (e.g. for conveying electrical power) and optical cables (e.g. optical fibres for conveying optical signals/data) are well known. For devices and sites that require connection to both a power and optical signals, typically such interconnection may be effected via: separate discrete one or more power cables, and separate discrete one or more optical cables. Alternatively, a plurality of power cables may be provided within a single overarching power cable assembly/trunking, and a plurality of optical cables may be provided within a single overarching optical cable assembly/trunking. Yet further alternatively, a hybrid cable may be provided comprising both power and optical cables within the same cable assembly/trunking. Previous cables are not always optimal and may give rise to complexities not least for example with regards to: manufacture, routing, assembly, installation, and connection. Such cables may give rise to difficulties and issues upon installation and connection on-site, particularly where the device to be connected is relatively inaccessible (such as an RRU located on a tower or side of building) necessitating the cables to be hoisted into position for connection. Optical and hybrid cables may need to be bespoke and factory manufactured to a particular pre-determined length, thereby presenting significant difficulties should the length of the cable subsequently need to be adjusted on-site upon installation. It is useful to provide an apparatus, such as a cable, that may facilitate assembly, installation, and connection.

The listing or discussion of any prior-published document or any background in this specification should not necessarily be taken as an acknowledgement that the document or background is part of the state of the art or is common general knowledge. One or more aspects/examples of the present disclosure may or may not address one or more of the background issues.

BRIEF SUMMARY

According to one or more examples of the disclosure there is provided an apparatus comprising:
an outer longitudinally extending member comprising a longitudinally extending perimeter region defining an inner longitudinally extending cavity; and
at least a first longitudinally extending conductor and a separate second longitudinally extending conductor;
wherein the at least first and second longitudinally extending conductors are embedded within the longitudinally extending perimeter region and extend along the length thereof.

According to one or more examples of the disclosure there is provided one or more of: a cable, a power supply cable and a composite modular cable comprising the above apparatus. In certain examples, the apparatus may be a modular power and optical cable for interconnecting an RRU with: a PSU and a BBU.

According to one or more examples of the disclosure there is provided a system comprising the above apparatus and one or more of: a RRU, a Remote Radio Head (RRH), a BBU, a PSU, and a Base Station (BST) of a wireless communication network.

According to one or more examples of the disclosure there is provided a method comprising:
providing an apparatus as mentioned above; and
inserting one or more inner longitudinally extending members into the inner longitudinally extending cavity.

According to one or more examples of the disclosure there are provided examples as claimed in the appended claims.

BRIEF DESCRIPTION OF THE DRAWINGS

For a better understanding of various examples of the present disclosure that are useful for understanding the detailed description and certain embodiments of the invention, reference will now be made by way of example only to the accompanying drawings in which.

Figure 1A:
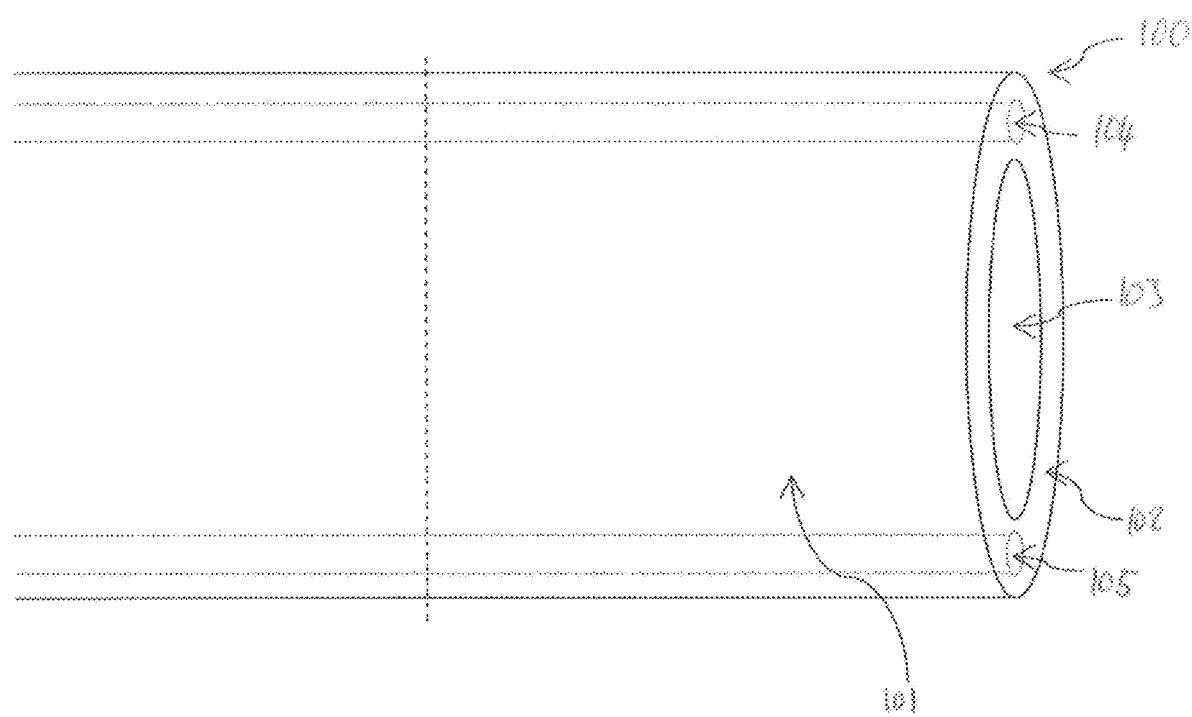
FIGS. 1A and 1B schematically illustrate an example apparatus of the present disclosure.

The Figures are not necessarily to scale. Certain features and views of the figures may be shown schematically or exaggerated in scale in the interest of clarity and conciseness. For example, the dimensions of some elements in the figures may be exaggerated relative to other elements to aid explication. Similar reference numerals are used in the figures to designate similar features. For clarity, all reference numerals are not necessarily displayed in all figures.

DETAILED DESCRIPTION

The Figures schematically illustrate an apparatus 100 comprising:
an outer longitudinally extending member 101 comprising a longitudinally extending perimeter region 102 defining an inner longitudinally extending cavity 103; and
at least a first longitudinally extending conductor 104 and a separate second longitudinally extending conductor 105;
wherein the at least first and second longitudinally extending conductors 104, 105 are embedded within the longitudinally extending perimeter region 102 and extend along the length thereof.

Figure 3:
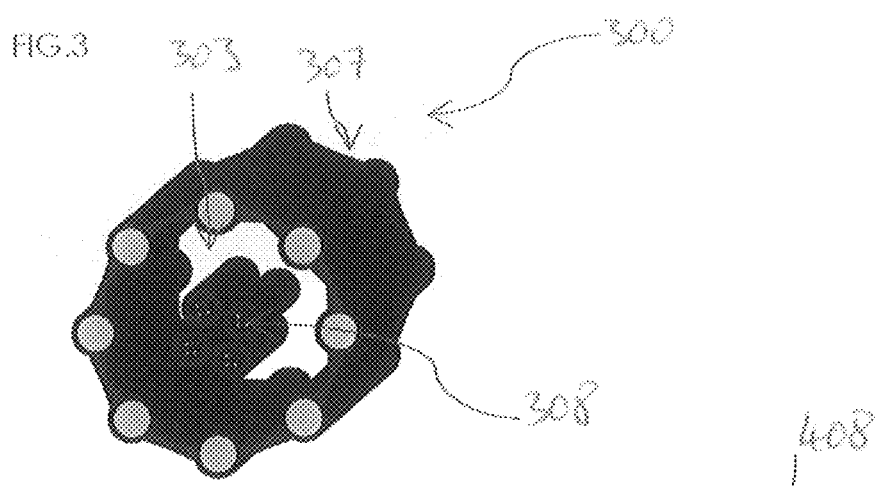
FIG. 3 schematically illustrates a yet further example apparatus of the present disclosure.
Figure 5A:
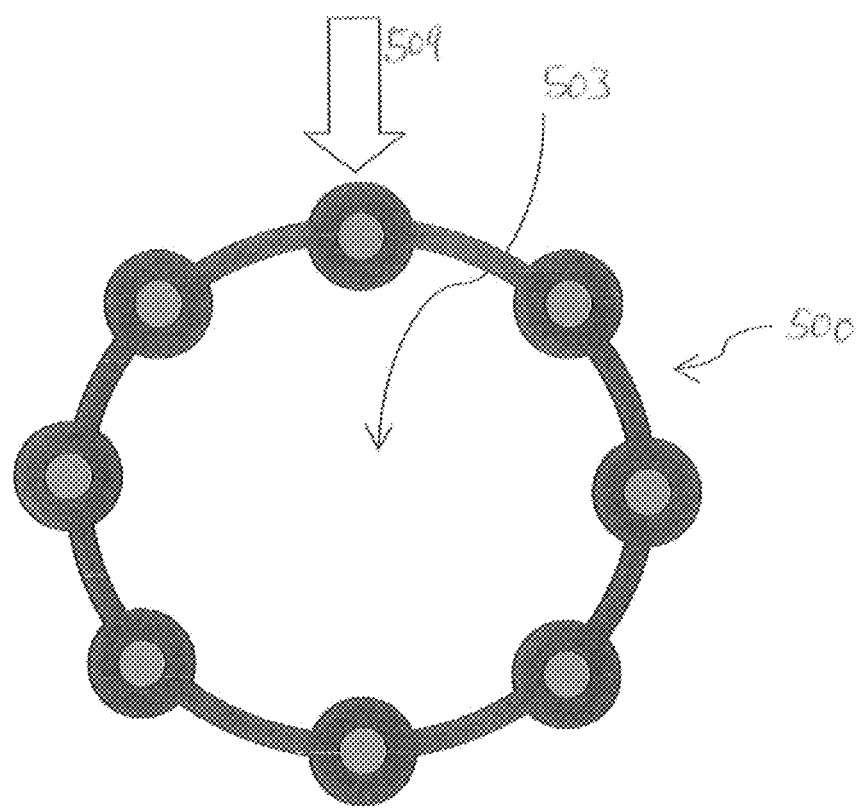
FIGS. 5A and 5B schematically illustrate a yet further example apparatus of the present disclosure.
Figure 5B:
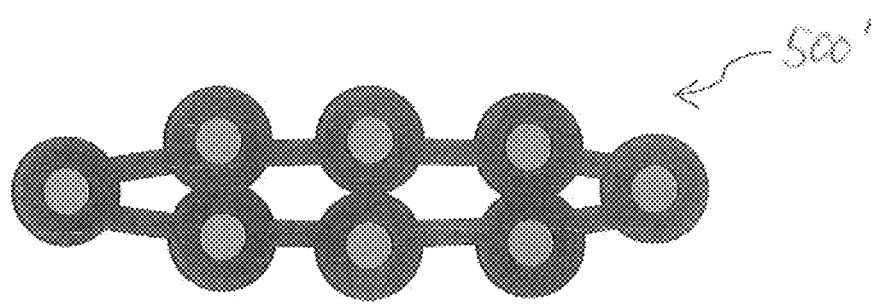

For the purposes of illustration and not limitation, the apparatus may provide an electrical power cable wherein a longitudinally extending hollow tubular member is manufactured from an insulating jacketing material (e.g. not least Polyethylene (PE)), which serves as a common, unitary and integral jacket, sheath and/or insulator for the first and second conductors (e.g. not least first and second copper wires) that are disposed within and arranged around the periphery of the hollow tubular member. The hollow tubular member thereby itself defines and provides a jacket to the conductors/wires which provides electrical insulation for the conductors/wires as well as insulating the conductors/wires from one another. For applications where only electrical power is required, the central cavity defined by the hollow tubular member/hollow tubular common jacket of the cable may be left open/hollow. Such examples may provide the advantage of enabling the cable to be compressed/flattened (as illustrated in FIGS. 5A and 5B) so that, in effect, the void is removed such that the cable may adopt a more compact (i.e. flattened) configuration thereby saving space. For applications where both electrical power and optical data signalling is required, then the central cavity may serve as a conduit/duct/ductwork for the insertion therein of one or more additional cables, such as fibre optic cables, that are fed into the central cavity (as illustrated in FIG. 3). Examples of apparatuses according to the present disclosure may provide the advantage of increasing the flexibility and utility of a power cable by enabling it to be configured in a space efficient configuration and/or enable differing types of cable to be additionally used to provide a composite (e.g. power and optical) cable that is modular; the modular cable comprising: a first cable module comprising the conductors/wires embedded within and concentrically arranged around the tubular member/common jacket, and a second (inner) cable module comprising an optical cable inserted into the central cavity of the first cable module. Such a composite modular cable, providing both electrical power and optical data signalling, may be particularly advantageous for connecting an RRU to both a PSU and a BBU; as well as facilitating the installation thereof (e.g. as only a single composite cable need be hoisted into position for installation and connection).

Figure 6:
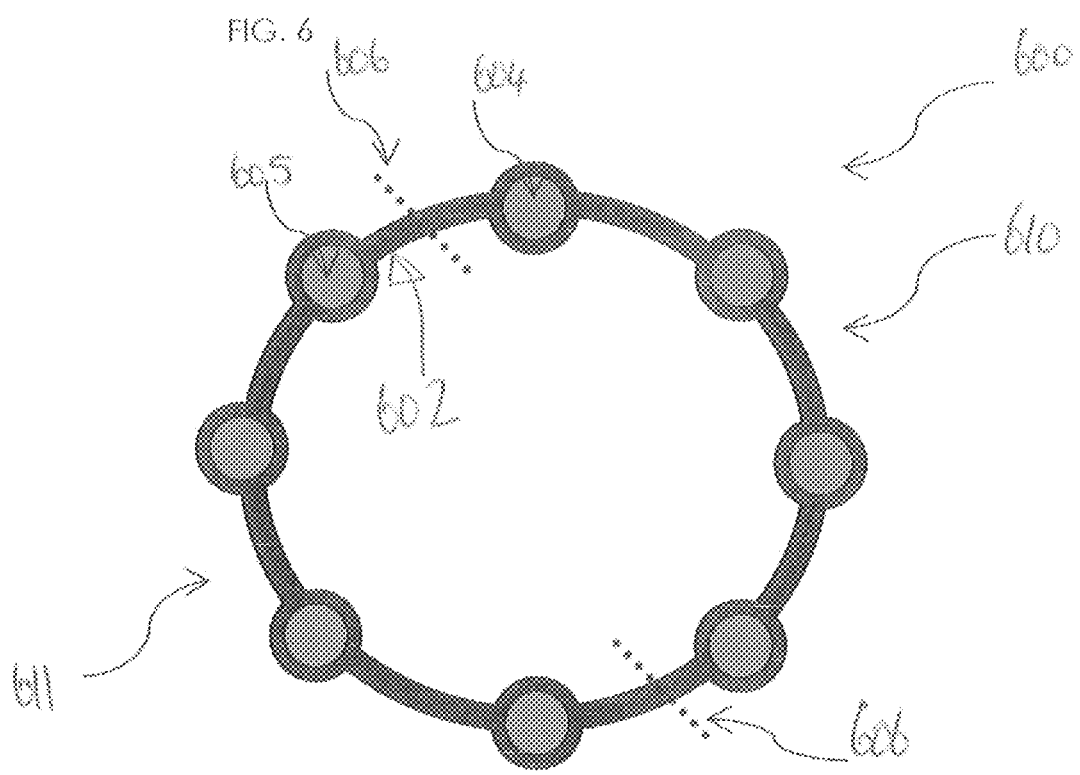
FIG. 6 schematically illustrates a yet further example apparatus of the present disclosure.
Figure 7:
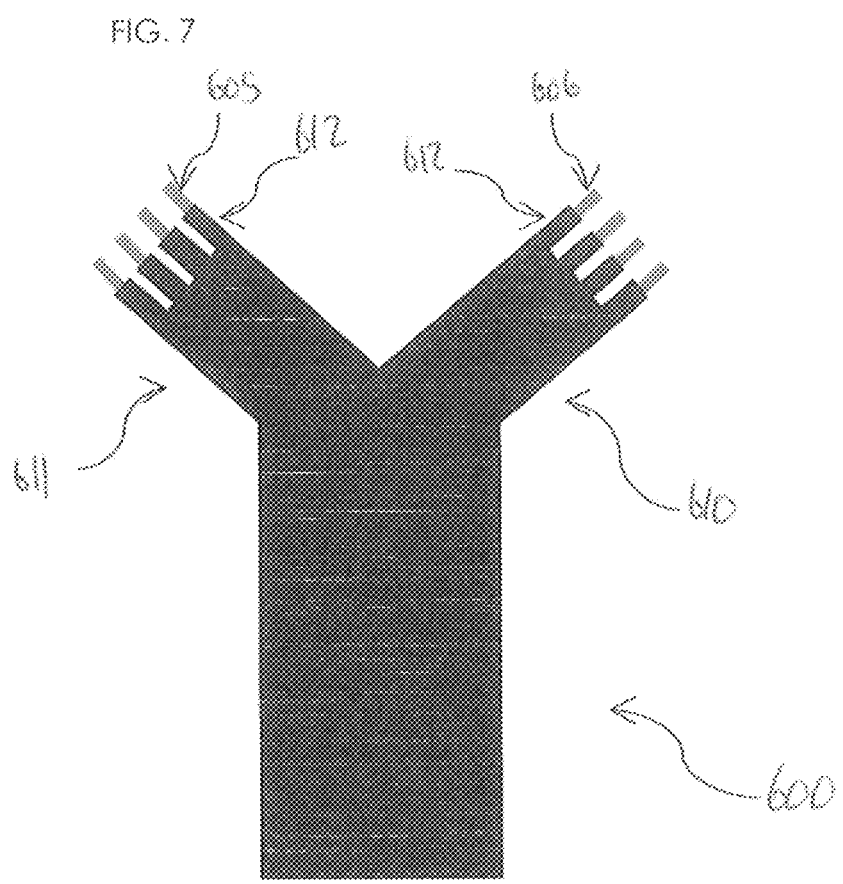
FIG. 7 schematically illustrates a yet further example apparatus of the present disclosure.

Yet furthermore, in certain examples, the apparatus/cable is configured with weakened sections of the hollow tubular member/common jacket between the conductors/wires such that the conductors/wires can be easily manually split to separate sub-cables and/or individual wires (as illustrated in FIGS. 6 and 7). Advantageously, this may further facilitate the installation and connection of the cable/sub-cables/wires.

FIG. 1A schematically illustrates a side of view of an apparatus 100 according to an example of the present disclosure. The apparatus 100 comprises a longitudinally extending member 101 comprising an outer longitudinally extending perimeter region 102 defining an inner longitudinally extending cavity 103. At least a first longitudinally extending conductor 104 and a separate second longitudinally extending conductor 105 are embedded within the longitudinally extending perimeter region 102 and extend along the length thereof.

Figure 1B:
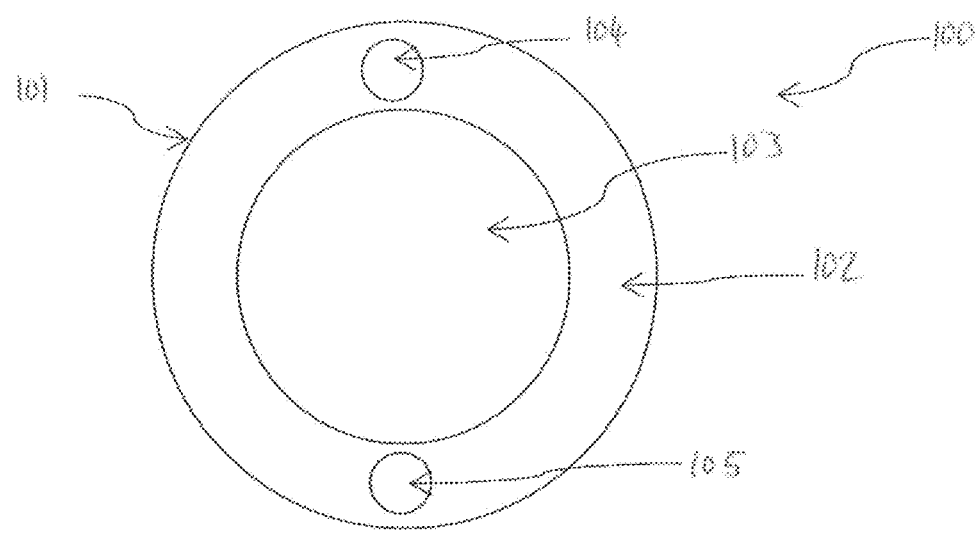

FIG. 1B schematically illustrates a cross sectional of view of the apparatus 100 along the line A-A of FIG. 1A.

Figure 2A:
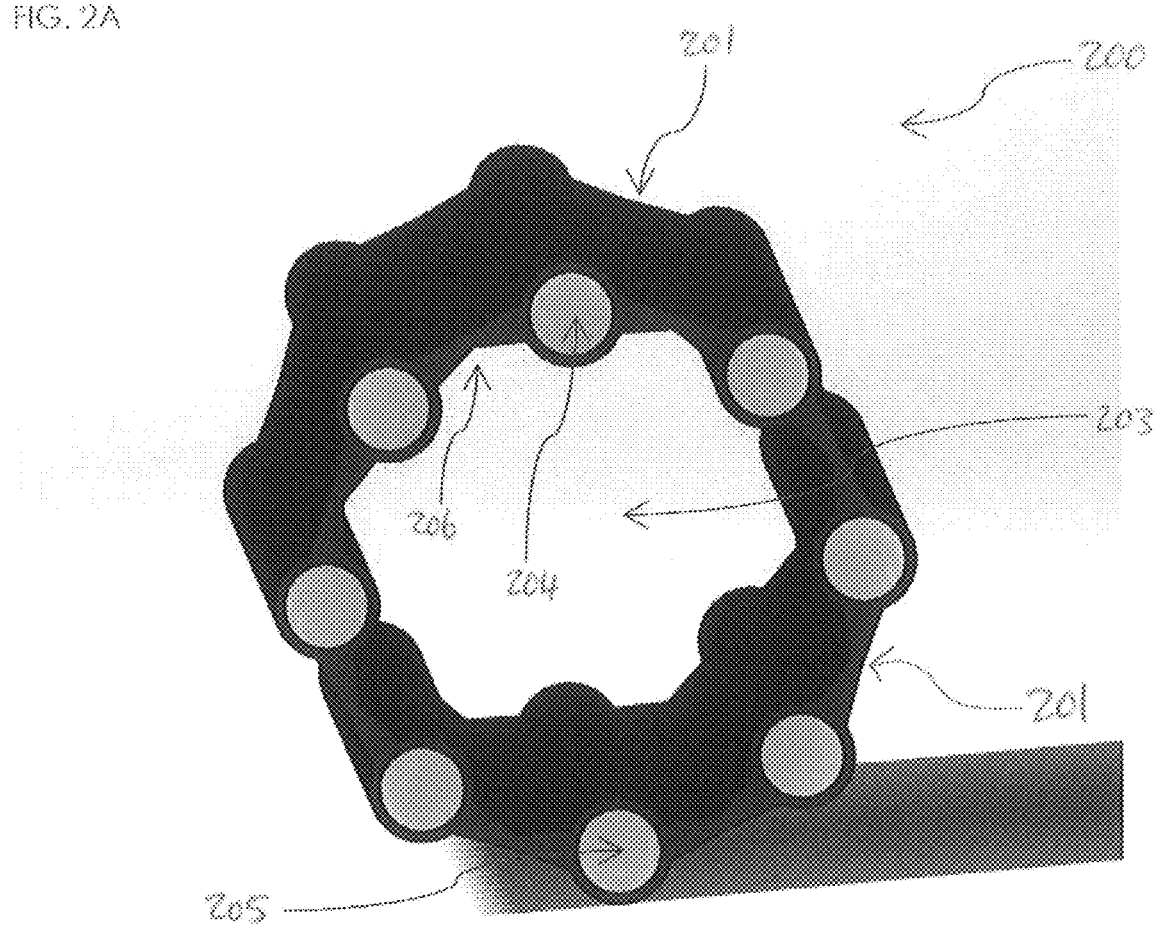
FIGS. 2A and 2B schematically illustrate a further example apparatus of the present disclosure.
Figure 2B:
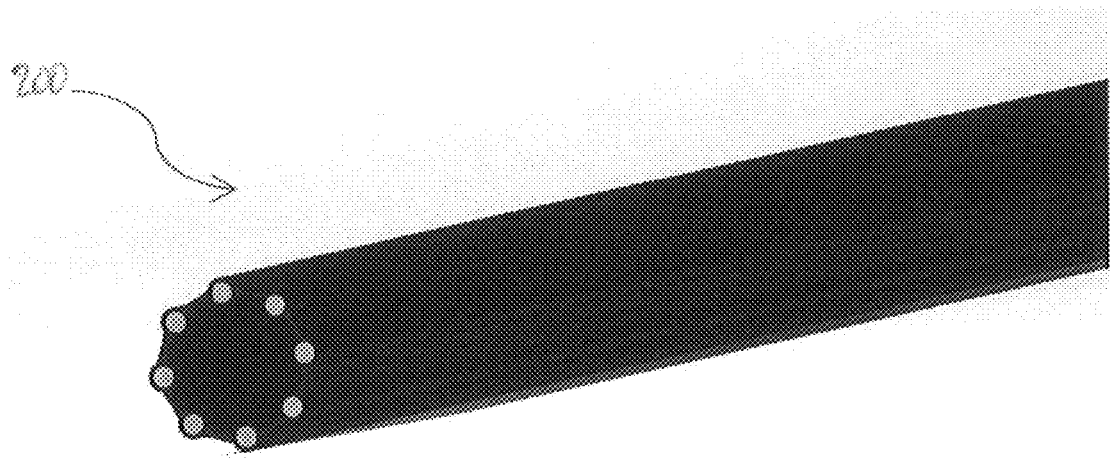

FIG. 2A illustrates a cross sectional of view of a further apparatus 200 according to another example of the present disclosure. FIG. 2B shows a perspective of view of the same. The apparatus 200 is elongate and longitudinally extending and may take the form of a cable, such as an electrical power cable for conveying electrical power to a device. The apparatus 200 comprises an elongate longitudinally extending hollow tubular structural member 201. The hollow tubular structural member 201 comprises a longitudinally extending perimeter region 202, i.e. longitudinally extending perimeter wall, that defines a longitudinally extending central inner cavity 203, i.e. a hollow interior of the cable 200.

A plurality of separate and longitudinally extending conductors 204, 205, e.g. wires, are embedded/encapsulated within the longitudinally extending perimeter region/wall 202. The plurality of conductors itself extends along the length of the longitudinally extending perimeter region/wall 202. In the example shown in FIGS. 2A and 2B, the conductors are substantially evenly distributed in a circular arrangement around the circumference of the longitudinally extending hollow tubular member. However, it is to be appreciated that alternative distributions/arrangements of the embedded conductors around the circumference/perimeter may be possible. Also, alternative cross sectional shapes, e.g. other than substantially circular, may be possible for the hollow member.

The elongate longitudinally extending hollow tubular structural member 201 is made from an electrically insulating material, not least not least Polyethylene (PE), which serves as a jacketing material for the conductors embedded therein. The hollow tubular member directly covers the conductors to form a jacket/insulating sheath for the same. Accordingly, the embedded conductors are jacketed/sheathed/covered in the insulating jacketing material of the elongate longitudinally extending hollow tubular structural member 201 such that the elongate longitudinally extending hollow tubular structural member 201 serves as a common, unitary and/or integral jacket and/or insulator to the conductors. This provides an insulating cover for the conductors and insulates the conductors from one another.

FIG. 2A also shows a section 206 of the longitudinally extending perimeter wall, which is disposed between the jacketed conductors, that has a reduced thickness. Such a weakened section of the perimeter wall enables the manual splitting/separation of the apparatus (without requiring the use of tools) as discussed further below with respect to FIGS. 6 and 7.

In some examples, the longitudinally extending hollow tubular member 201 defines an outer sheath/layer for a cable or an outermost sheath/layer for a cable. In other examples, one or more additional coatings and/or layers (e.g. protective layers) may be provided around the hollow member 201.

The electrically conductive conductors 204 and 205 are configured to convey electrical power to power a device, e.g. a DC voltage. The conductors may be designed for low, medium, and/or high voltage applications. In other examples, different types of conductor may be used, e.g. configured to convey electrical data signals instead of or in addition to conveying electrical power.

As used herein, a "conductor" may be a medium or means configured to conduct electricity, for example an electrically conductive material. The conductor may be a wire, such as a single-wire or a multi-strand wire. It may be in a tubular form or in a strand form. Non-limiting examples of suitable conductors include copper as well as other electrically conductive metals such as: silver, gold, carbon, aluminium. Also, other electrically conductive materials, such as non-metals, e.g. a carbon/graphene based conductors may be used.

As used herein, a wire may denote a single conductor. A wire may be a rod or one or more strands of a conductor for conveying electricity (e.g. for conveying electrical power and/or electrical signals/data). The wire may be a solid wire, e.g. a single solid core of a conductor material. The wire may be a stranded wire, e.g. a plurality of strands of a conductor bundled or wrapped together (wherein each of the plurality of stands is not insulated from the other strands thereby not forming a separate individual conductor). The wire may be a braided wire, e.g. a plurality of strands of a conductor braided together (wherein each of the plurality of stands is not insulated from the other strands).

As used herein, a cable may denote a group of two or more conductors, e.g. an assembly of two or more wires that are electrically insulated from one another and bound together within a common insulation, covering and/or protective jacket.

FIG. 3 schematically illustrates an example of an apparatus/cable 300 similar to that of FIGS. 2A and 2B. The apparatus comprises an inner cavity 303 that is configured (i.e. suitable dimensioned) so as to be able to receive therein an insertion of one or more longitudinally extending members 308 to be disposed within inner cavity 303.

The longitudinally extending inner cavity 303 acts as a duct, ductwork, conduit or channel to allow the insertion/passage of one or more longitudinally extending elongate members 303, (which, in the example of FIG. 3, comprise optical fibres). The provision of an inner cavity configured and dimensioned to enable the insertion therein/receiving therein of one or more further cables increases utility and flexibility of the apparatus/cable 300. In effect, the cable 300 may act as modular cable having a first cable module 307 (i.e. the longitudinally extending tubular member with wires embedded therein) with an additional inner cable module 308 (e.g. differing inner core cables) that may be fed into the first module/outer tubular structure. This may thereby provide a composite/hybrid cable, e.g. power transmission via the conductors/wires embedded in the perimeter of the tubular member and optical signalling via one or more optical fibre cables within the cavity. The outer tubular structure member, with its embedded wires, may also advantageously provide mechanical protection for the internal optical fibre cable(s). Furthermore, such a composite modular cable may increase ease of installation. For example, where a device requires electrical power as well as optical fibre connection [e.g. a RRU, or Remote Radio Head (RRH), of a Base Transceiver Station (BTS) or a Base Station of a wireless communication network] various examples of the disclosure may provide a modular cable (wherein electrical power may be supplied via the embedded conductors/wires) with an inner cable module, comprising one or more optical fibres, that may be inserted into the inner cavity to provide a composite/hybrid power and optical fibre cable. Such a composite/hybrid cable facilitates installation as it would not require a separate specific dedicated installation (e.g. routing and hoisting) for a separate/individual power and optical cables.

In FIG. 3 the (optional) inner core cable module 308, i.e. the one or more longitudinally extending members, comprises optical fibre cables. In other examples, the (optional) one or more longitudinally extending members may be configured so as to provide a differing type of cabling suited for the particular application/requirement at hand. For example, instead of (or in addition to) an optical fibre cable, the inner core module may comprise one or more of: a wire (e.g. for conveying power or data), a cable, and a filler member. For applications where only power is needed, then no inner core cable module need be inserted, i.e. the core may be left open, e.g. as per FIGS. 2A and 2B [and also as per FIGS. 5A and 5B which, as discussed below, can be compressed to save space].

The type of core/inner cable module that may be inserted into the inner cavity may be dependent on the application/use of cable, e.g.: a "fibre core" [as per FIG. 3], an "electrical power core", a "data signal core", and a "dummy core"—as discussed below in FIG. 4.

Figure 4:
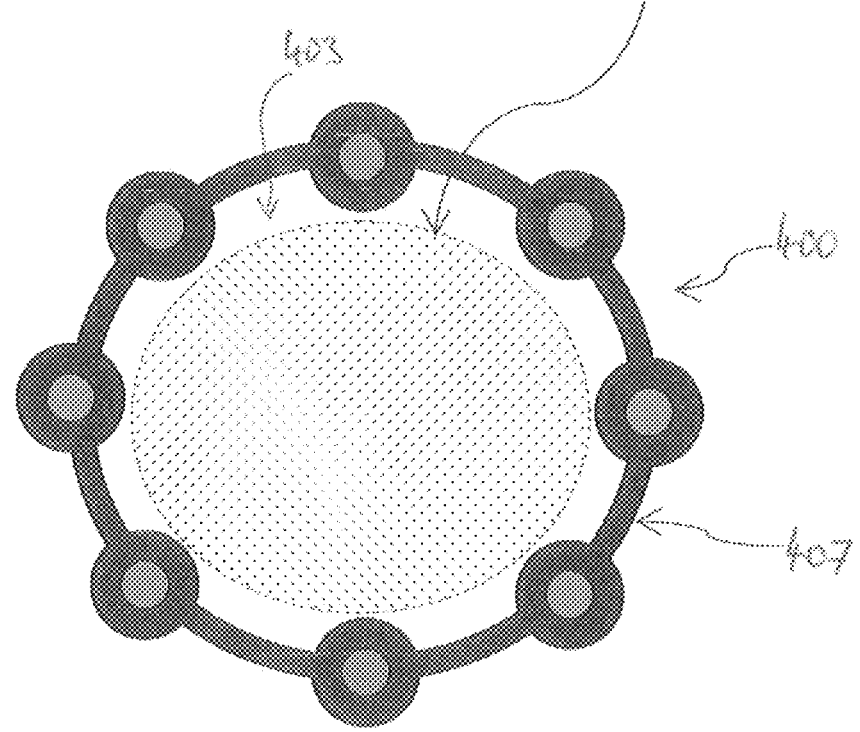
FIG. 4 schematically illustrates a yet further example apparatus of the present disclosure.

FIG. 4 shows an apparatus/cable 400 having a first cable module 407 (namely an elongate longitudinally extending tubular structural member with conductors/wires embedded therein) with a second cable module 408—namely a "dummy core" 408 comprising a longitudinally extending filler member disposed within and substantially filling an inner cavity 403 of the cable. Such a "dummy core" 408 may provide structural support to the longitudinally extending tubular member of the cable 400.

FIGS. 5A and 5B show an apparatus/cable 500 whose inner cavity 503 is devoid of any such second inner cable modules of FIGS. 3 and 4, and instead the central cavity remains empty. The cable 500 may be configured to be compressible/flexible in a direction non-parallel, e.g. perpendicular, to its longitudinal length, i.e. when a lateral force (as indicated by arrow 509) is applied this may compress the perimeter walls of the tubular member towards one another thereby decreasing a lateral dimension of the cable (i.e. a dimension in a direction perpendicular to its longitudinal length, e.g. its height) such that the apparatus may be configured in a compacted configuration 500' as shown in FIG. 5B.

The use of a cable with a hollow and empty cavity (i.e. no: fibre, power, data, or dummy core therein) enables cable to be compressible and flattened during use (e.g. once the cable has been installed and duly connected) thereby saving space.

FIG. 6 shows an apparatus/cable 600 comprising at least one portion 606 of the perimeter wall 602 (which located between the embedded at least first and second conductors/wires 604 and 605) that is configured to be weakened/frangible (as schematically indicated by a dotted line in FIG. 6) so as to enable manual/user separation of the at least first and second conductors.

The wires are joined together by virtue of being separately embedded in the jacketing material of the common unitary jacket. However, a portion of the jacket (e.g. an elongate portion that may extend along the length of the jacket) between the wires is thinned/provided with a reduced thickness so as to weaken the portion of the jacketing material between the wires and enabling the jacketed wires to be easily split apart/separated from one another by a user, whilst each wire is still individually covered/jacketed in the jacketing material (and hence maintaining the insulation of each wire following the separation).

The portion 606 of the perimeter 602 may be weakened along the longitudinal length of the perimeter. The weakening may be via any suitable means, e.g. not least for example by: modifying the dimensions of portion (e.g. reducing the thickness of the perimeter region 602 at the portion 606 [this is also shown with respect to 206 of FIG. 2A]), providing an (elongate) indentation and providing perforations. Such weakening of the portion 606 may enable a user to manually split up/separate out/rip apart the wires (whilst the wires still maintain 360 degree wrap around coverage of the jacket material so that each separated wire is still jacketed/insulated) without the requirement of a tool. Advantageously, this may facilitate the installation, arrangement and attachment of the wires to their respective connectors on the device that the cable is to connect to.

Such separability of the cable 600 may allow the main trunk of the cable to be split into two or more separate sub-cable branches 610, 611, as shown with respect to FIG.

7. Moreover, each sub cable branch is able to be split further into separate individual jacketed wires 612 which remain covered and insulated by the jacketing material.

FIG. 7 further shows the ends of each individual wire being stripped bare, ready for installation/connection (such additional stripping of the jacket material from a wire to make a bare/exposed part of the wire may involve the use of a tool such as a wire stripper).

As previously discussed with respect to FIG. 3, depending on the application/requirements of the interconnection (i.e. if a device requires just a power connection, or if both power and optical connection are required) an additional inner cable module, e.g. comprising one or more optical fibres, may be inserted through the interior cavity that may be duly terminated or spliced for connection to a device (not shown).

Advantageously, such user separability of the cable (in a manner not dissimilar to the ability of a user manually separating out the ends of a speaker cable into two speaker wire portions for connection to a speaker) may facilitate installation and connection of the cable, e.g. so that at the end of the cable some of the power cables can be attached to a right hand side of a module/device and others can be on the left hand side of the module/device.

Figure 8:
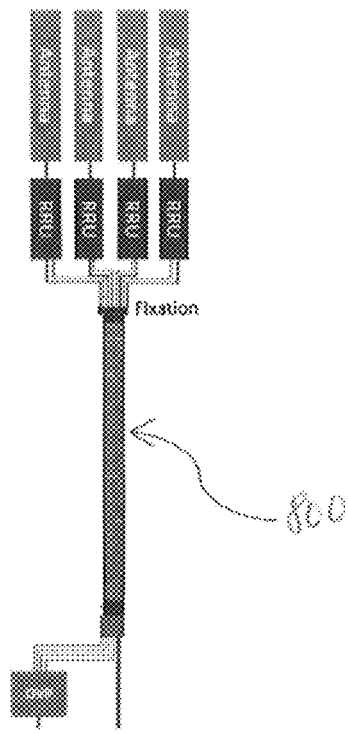
FIG. 8 schematically illustrates use of an example apparatus of the present disclosure.

FIG. 8 schematically illustrates an example use of an apparatus 800 according to the present disclosure. The apparatus 800 comprises a plurality of conductors/wires for providing power to a plurality of RRU's (i.e. interconnecting the RRU's to a PSU via an OverVoltage Protection (OVP) device. The apparatus 800 also comprises an inner cable module comprising a plurality of optical fibres for providing optical signalling/data to the plurality of RRU's, i.e. interconnecting the RRU's to a BSU (not shown).

Figure 9:
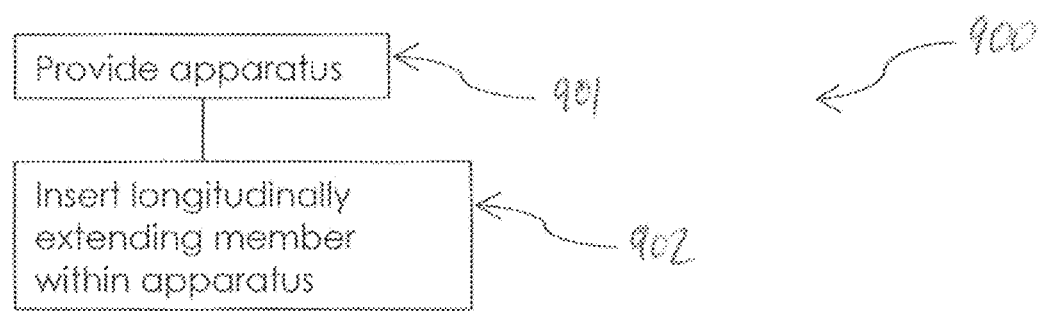
FIG. 9 schematically illustrates an example method of the present disclosure.

FIG. 9 illustrates a flow chart diagram of a method 900 according to the present disclosure. In block 901, an apparatus as discussed above is provided. In block 902, a longitudinally extending member is inserted into an inner cavity of the apparatus, thereby providing a composite modular cable. The one or more longitudinally extending members in the inner cable module may comprise one or more of: an optical fibre, a wire, a cable, and a filler member.

Although specific terms are employed herein, they are used in a generic and descriptive sense only and not for purposes of limitation. Where a structural feature has been described, it may be replaced by means for performing one or more of the functions of the structural feature whether that function or those functions are explicitly or implicitly described.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not. Accordingly, features described in relation to one example/aspect of the disclosure may include any or all of the features described in relation to another example/aspect of the disclosure, and vice versa, to the extent that they are not mutually inconsistent.

Although various examples of the present disclosure have been described in the preceding paragraphs, it should be appreciated that modifications to the examples given can be made without departing from the scope of the invention as set out in the claims.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e. so as to provide direct or indirect connection/coupling/communication. Any such intervening components may include hardware and/or software components.

In this description, reference has been made to various examples. The description of features or functions in relation to an example indicates that those features or functions are present in that example. The use of the term 'example' or 'for example' or 'may' in the text denotes, whether explicitly stated or not, that such features or functions are present in at least the described example, whether described as an example or not, and that they can be, but are not necessarily, present in some or all other examples. Thus 'example', 'for example' or 'may' refers to a particular instance in a class of examples. A property of the instance can be a property of only that instance or a property of the class or a property of a sub-class of the class that includes some but not all of the instances in the class.

In this description, references to "a/an/the" [feature, element, component, means . . . ] are to be interpreted as "at least one" [feature, element, component, means . . . ] unless explicitly stated otherwise. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavouring in the foregoing specification to draw attention to those features of examples of the present disclosure believed to be of particular importance it should be understood that the applicant claims protection in respect of any patentable feature or combination of features hereinbefore referred to and/or shown in the drawings whether or not particular emphasis has been placed thereon.

The examples of the present disclosure and the accompanying claims may be suitably combined in any manner apparent to one of ordinary skill in the art.

Each and every claim is incorporated as further disclosure into the specification and the claims are embodiment(s) of the present invention. Further, while the claims herein are provided as comprising specific dependencies, it is contemplated that any claims may depend from any other claims and that to the extent that any alternative embodiments may result from combining, integrating, and/or omitting features of the various claims and/or changing dependencies of claims, any such alternative embodiments and their equivalents are also within the scope of the disclosure.

We claim:

1. An apparatus comprising:
   an outer longitudinally extending member comprising a longitudinally extending perimeter region defining an inner longitudinally extending cavity; and
   at least a first longitudinally extending conductor and a separate second longitudinally extending conductor, wherein
   the at least first and second longitudinally extending conductors are embedded within the longitudinally extending perimeter region and extend along the length thereof; and
   at least one portion of the perimeter region, located between the embedded at least first and second longitudinally extending conductors, is configured to be weakened so as to enable user separation of the at least first and second longitudinally extending conductors.

2. The apparatus of claim 1, wherein the inner longitudinally extending cavity is configured to receive therein an insertion of one or more inner longitudinally extending members to be disposed therein.

3. The apparatus of claim 2, wherein the one or more inner longitudinally extending members comprises one or more of: an optical fibre, a wire, a cable, and a filler member.

4. The apparatus of claim 1, wherein the apparatus is configured to be compressible in a direction non-parallel to its longitudinal length.

5. The apparatus of claim 1, wherein the at least first and second longitudinally extending conductors are substantially evenly distributed around the perimeter of the outer longitudinally extending member.

6. The apparatus of claim 1, wherein the at least first and second longitudinally extending conductors are wires configured to convey electrical power.

7. The apparatus of claim 1, wherein the outer longitudinally extending member defines a common jacket for the at least first and second longitudinally extending conductors.

8. The apparatus of claim 1, wherein the outer longitudinally extending member defines one or more of: a jacket for a cable, and an outer sheath for a cable.

9. The apparatus of claim 1, wherein the apparatus is one or more of: a cable, a power supply cable, and a composite modular cable.

10. A modular cable comprising:
    the apparatus of claim 1; and
    at least one: wire, cable, optical fibre, and longitudinally extending filler member inserted within the inner longitudinally extending cavity.

11. A device comprising the apparatus of claim 1.

12. A system comprising the apparatus of claim 1 and one or more of: a Remote Radio Unit, a Remote Radio Head, a Base Band Unit, a Power Supply Unit, and a Base Station of a wireless communication network.

13. A method comprising causing, at least in part, actions that result in:
    providing an apparatus as claimed in claim 1; and
    inserting one or more inner longitudinally extending members into the inner longitudinally extending cavity.

14. The method of claim 13, wherein the one or more inner longitudinally extending members comprises one or more of: an optical fibre, a wire, a cable, and a filler member.

15. An apparatus comprising:
    an outer longitudinally extending member comprising a longitudinally extending perimeter region defining an inner longitudinally extending cavity; and
    at least a first longitudinally extending conductor and a separate second longitudinally extending conductor, wherein
    the at least first and second longitudinally extending conductors are embedded within the longitudinally extending perimeter region and extend along the length thereof, and
    the apparatus is configured to be compressible in a direction non-parallel to its longitudinal length.

16. The apparatus of claim 15, wherein the inner longitudinally extending cavity is configured to receive therein an insertion of one or more inner longitudinally extending members to be disposed therein.

17. The apparatus of claim 16, wherein the one or more inner longitudinally extending members comprises one or more of: an optical fibre, a wire, a cable, and a filler member.

18. The apparatus of claim 15, wherein the at least first and second longitudinally extending conductors are substantially evenly distributed around the perimeter of the outer longitudinally extending member.

19. The apparatus of claim 15, wherein the at least first and second longitudinally extending conductors are wires configured to convey electrical power.

20. The apparatus of claim 15, wherein the outer longitudinally extending member defines a common jacket for the at least first and second longitudinally extending conductors.

* * * * *